UNITED STATES PATENT OFFICE.

FRIEDRICH RUNKEL, OF ELBERFELD, GERMANY, ASSIGNOR TO THE FARBENFABRIKEN, VORMALS FR. BAYER & CO., OF SAME PLACE.

TRIPHENYLMETHANE DYE.

SPECIFICATION forming part of Letters Patent No. 501,104, dated July 11, 1893.

Application filed January 19, 1893. Serial No. 458,896. (Specimens.) Patented in Germany September 10, 1890, No. 60,606; in England September 16, 1890, No. 14,621, and in France September 19, 1890, No. 208,330.

*To all whom it may concern:*

Be it known that I, FRIEDRICH RUNKEL, doctor of philosophy, chemist, (assignor to the FARBENFABRIKEN, VORMALS FR. BAYER & CO., of Elberfeld,) a subject of the Emperor of Germany, residing at Elberfeld, Germany, have invented a new and useful Improvement in the Manufacture of Coloring-Matters belonging to the series of Triphenylmethane Dye-Stuffs, (for which the aforesaid FARBENFABRIKEN has already obtained Letters Patent in the following countries: Germany, No. 60,606, dated September 10, 1890; England, No. 14,621, dated September 16, 1890, and France, No. 208,330, dated September 19, 1890,) of which the following is a specification.

My invention relates to the production of a new valuable triphenylmethane dye-stuff by combining equal molecular proportions of tetramethyldiamidobenzhydrol and benzoic acid and by subsequently oxidizing the first produced leuco compound, which corresponds to the formula:

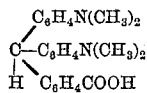

and by precipitating the dye-stuff for instance by means of zinc chlorid and common salt.

The following is a clear and exact description of the process for producing my new coloring-matter:

Six kilos, by weight, of tetramethyldiamidobenzhydrol are thoroughly mixed with 2.71 kilos, by weight, of benzoic acid, and the obtained mixture is slowly and with stirring introduced into thirty kilos, by weight, of concentrated sulfuric acid at 66° Baumé, taking care that the temperature does not rise above 60° centigrade during the whole operation. The temperature then is raised to about 80° centigrade and stirring is continued at this temperature for say about six hours, until the tetramethyldiamidobenzhydrol employed is no more distinguishable. The resulting mass is poured on fifty kilos, by weight, of ice and the liquid mixture thus obtained is filtered. After washing the residue on the filter with diluted sulfuric acid (containing five per cent. of acid) and after adding the filtrate so obtained to the above filtrate resulting by filtering the sulfuric solution, the whole filtrate is neutralized by means of soda-lye. The leuco compound separates and is isolated by filtering off and pressing. The product thus obtained is suspended in about one thousand liters of water and after stirring filtered off again, pressed and dried at about 40° centigrade, 7.4 kilos, by weight, of the last named leuco compound are dissolved in a cold mixture of twenty-five kilos, by weight, of an acetic acid solution (containing fifty per cent. of pure acetic acid) and five kilos, by weight, of an acetic acid solution (containing seventy-five per cent. of pure acetic acid) and 1.746 kilos of concentrated sulfuric acid at 66° Baumé. After the solution has cooled to about 18° centigrade 31.3 kilos, by weight, of a lead dioxide paste containing fifteen per cent. of lead dioxide are introduced, and the resulting mixture is well stirred for some time. In this manner the oxidation of the above leuco compound is easily effected and an oxidation product is formed which possesses the following composition:

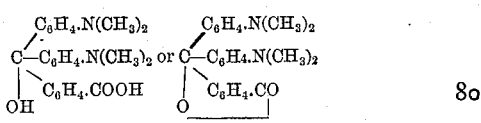

A solution of 6.6 kilos, by weight, of hydrochloric acid (containing ten per cent. of pure hydrochloric acid) and eighty kilos, by weight, of water which is previously heated to 60° centigrade is added, and the whole mixture is then filtered, in order to remove the lead sulfate. By adding a concentrated solution of zinc chlorid and a sufficient quantity of solid common salt to the filtrate, the salt of the oxidation product combined with zinc chlorid is precipitated. It is moderately dried, redissolved in a large quantity of water and the above double salt of the oxidation product in combination with zinc chlorid is precipitated again by the addition of zinc chlorid and common salt. By filtering off, pressing and drying at about 40° centigrade the dye-stuff is isolated in the known manner. It may be employed for dyeing either directly or after mixing it with dextrine or the like.

When not mixed with dextrine my new dyestuff forms, after having been pulverized, a dark reddish-brown powder with metallic luster. It easily dissolves in water with greenish-blue color and it is also soluble in alcohol with the same color. It is insoluble in ammonia-liquid. In sodium carbonate it is sparingly soluble at ordinary temperature with greenish-blue color. If the solution in sodium carbonate is heated for a long time, the blue liquid becomes colorless, while a further addition of acetic acid again produces the original color. It is insoluble in soda-lye. By diluted hydrochloric acid it is dissolved with yellowish-red color, which with the addition of water turns at first into greenish-yellow, and then into green. In diluted sulfuric acid it dissolves with brownish-yellow color, which turns into green on adding water to the sulfuric acid solution. When its watery solutions are mixed with ammonia liquid or soda-lye, they become colorless, while an addition of sodium carbonate does not effect a change in color. On the addition of hydrochloric or sulfuric acid to its watery solutions the color is changed into green. By concentrated sulfuric acid it is dissolved with yellow color, which remains on adding a small quantity of ice water, while the addition of a great quantity of water turns the color into green. It is most adapted for printing purposes, employing a paste containing the coloring-matter mixed with chromium acetate and one of the usual thickenings. It produces beautiful green shades fast against the action of fulling.

My new dye-stuff materially differs by its composition and by the shades obtained therewith in printing cotton from the analogous products which I have claimed and described in two separate specifications forming part of Letters Patent Nos. 476,413 and 476,414, dated June 7, 1892. In the former of these two specifications a product is described which is obtained from tetramethyldiamidobenzhydrol and alphahydroxynaphthoic acid by means of a similar process hereinbefore defined. In printing cotton therewith it produces pure blue shades.

The coloring-matter described in the specification of my Letters Patent No. 476,414, obtained in an analogous manner from tetramethyldiamidobenzhydrol and salicylic acid produces on cotton when printed therewith reddish violet shades.

Having thus described my invention and in what manner it can be performed, that which I claim as new, and desire to secure by Letters Patent, is—

1. The process of producing a new valuable triphenylmethane dye-stuff by combining in the presence of concentrated sulfuric acid equimolecular proportions of tetramethyldiamidobenzhydrol and benzoic acid and by subsequently oxidizing the resulting leuco compound.

2. The coloring-matter, which is a combination of zinc chlorid with the hydrochlorate of the product having the formula

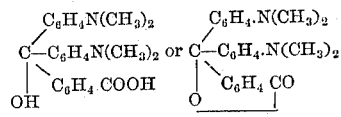

forming a dark reddish-brown powder with metallic luster, soluble in alcohol with greenish-blue color; easily soluble in water with greenish-blue color, which disappears when ammonia or soda-lye is added, but its aqueous solution is not changed by the addition of sodium carbonate but is changed by the addition of hydrochloric or sulfuric acid to green; soluble in ammonia; and sparingly soluble in sodium carbonate at ordinary temperature with greenish-blue color, which becomes colorless if this solution is heated for a long time, but a further addition of acetic acid again produces the original color, which is insoluble in soda-lye; soluble in dilute hydrochloric acid with yellowish-red color, turning at first on addition of water into greenish-yellow and then into green; soluble in dilute sulfuric acid with brownish-yellow color, turning into green on the addition of water; and soluble in concentrated sulfuric acid with yellow color, which remains unaltered on the addition of a small quantity of ice water, while the addition of a large amount turns the color green, and having the qualities substantially as specified.

FRIEDRICH RUNKEL.

Witnesses:
WM. ESSENWEIN,
RUDOLPH FRICKE.